United States Patent
Konrad et al.

(10) Patent No.: US 6,244,673 B1
(45) Date of Patent: Jun. 12, 2001

(54) METHOD OF AND DEVICE FOR TRACTION CONTROL IN A MOTOR VEHICLE

(75) Inventors: Werner Konrad, Schwieberdingen; Andreas Ziegler, Weissach, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/234,861

(22) Filed: Jan. 22, 1999

(30) Foreign Application Priority Data

Jan. 22, 1998 (DE) .............................................. 198 02 288

(51) Int. Cl.⁷ .................................. B60T 8/56; B60T 7/12
(52) U.S. Cl. ...................................... 303/142; 364/426.028
(58) Field of Search .............................. 303/113.2, 113.4, 303/139, 142–145, 154; 364/426.027, 426.028, 426.029

(56) References Cited

U.S. PATENT DOCUMENTS

| 5,139,115 | * | 8/1992 | Browne et al. | 188/1.11 |
|---|---|---|---|---|
| 5,325,300 | * | 6/1994 | Tsuyama et al. | 364/426.03 |
| 5,593,217 | * | 1/1997 | Schmitt et al. | 303/139 |
| 5,713,642 | * | 2/1998 | Okazaki | 303/121 |
| 5,732,380 | * | 3/1998 | Iwata | 701/85 |

FOREIGN PATENT DOCUMENTS 20 49 262   4/1972 (DE) .

* cited by examiner

Primary Examiner—Christopher P. Schwartz
(74) Attorney, Agent, or Firm—Kenyon & Kenyon

(57) ABSTRACT

A method and a device are described for traction control in a motor vehicle that is equipped with an anti-lock system. When the brake pedal is depressed and an unallowable slip occurs on at least one driving wheel, the brake pressure built up by the driver is controlled in the wheel brake associated with this wheel by setting the associated valve arrangement for traction control. This brake pressure control only takes place if at least one of the following criteria is met: the driver has actuated an additional switching element, the vehicle speed is less than a predefined threshold value, a predefined time period has not elapsed, and/or the gas pedal has been depressed.

8 Claims, 4 Drawing Sheets

METHOD OF AND DEVICE FOR TRACTION
CONTROL IN A MOTOR VEHICLE

FIELD OF THE INVENTION

The present invention relates to a method and a device for traction control in a motor vehicle.

BACKGROUND INFORMATION

German Patent No. 20 49 262 describes a traction control device for a motor vehicle, where the braking pressure on a driving wheel is increased by an anti-lock device when this wheel tends to spin, thus reducing the tendency to spin and allowing the vehicle to start moving. To increase the pressure, the driver is expected to actuate the brake pedal, so that the braking pressure built up by the driver is used for increasing the wheel brake pressure via appropriate control of a valve arrangement. In addition, this traction control is intended to be performed only if a switch that closes when the accelerator is depressed has been actuated.

If such a traction control is active, the braking action cannot be built up immediately if the driver suddenly wishes to brake, since the connection between the main brake cylinders, i.e., the service brake valve, and the wheel brakes of the unregulated wheels must be blocked.

SUMMARY OF THE INVENTION

An object of the present invention is to provide measures to improve traction control, in terms of availability of the braking system, in which the required braking pressure for braking at least one driving wheel must be applied via actuation of a pedal by the driver.

A simple method capable of being implemented without additional measures is proposed to help the vehicle start moving, with whose help a differential blocking effect is achieved. It is particularly advantageous that the performance of the traction control is restricted to the start phase, so that outside the given operating phase the vehicle can be braked immediately if the driver so wishes. Critical driving situations are thus effectively avoided.

According to the present invention, in addition to acting on the brakes to prevent at least one driving wheel from spinning, the engine is also acted upon in order to reduce the torque when at least one driving wheel starts to spin. It is advantageous that this action on the engine, like the action on the brakes, depends on the presence of conditions required for braking.

In another aspect of the present invention, the presence of drive slip and thus of the need for activating the traction control is indicated to the driver in a suitable manner, for example, via a light, a buzzer, or the like.

It is particularly advantageous that, depending on the application, different control principles can be used. By comparing the rotation speed of the driving wheels, a differential locking effect can be advantageously achieved, and braking pressure can be built up if the wheel rotation speeds differ from one another in an unallowable manner. Furthermore, the traction control can be activated if a wheel rotation speed differs from a predefined reference value by an unallowable amount.

DETAILED DESCRIPTION

Figure 1:
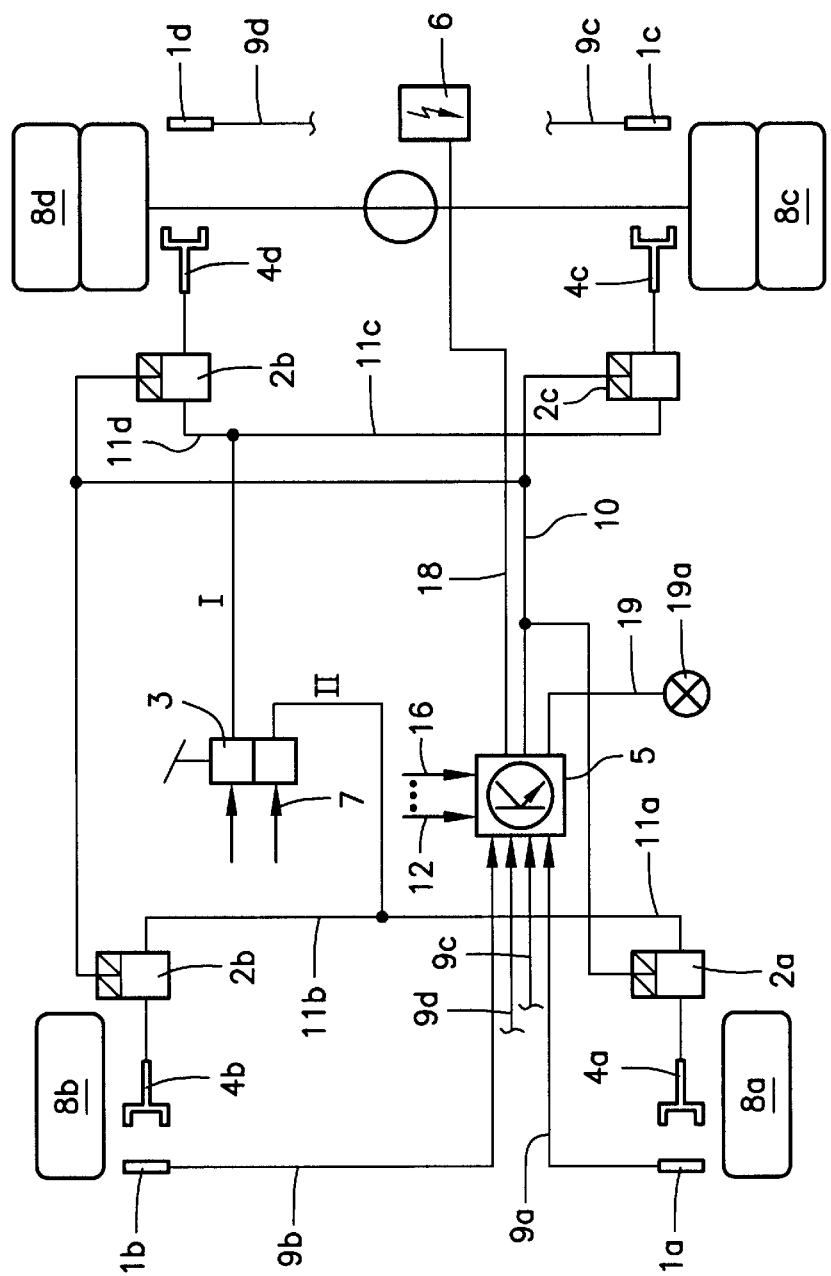
FIG. 1 shows, using an exemplary pneumatic brake system of a utility vehicle, a design of an anti-lock system for implementing a traction control according to the present invention.

FIG. 1 shows the construction of an anti-lock system for a pneumatic brake system in which the transaction control according to the present invention is implemented. Similar anti-lock systems are also used for hydraulic brake systems. The traction control according to the present invention is capable of being used for appropriate hydraulic brake systems as well.

FIG. 1 shows wheels 8a and 8b of a front axle and wheels 8c and 8d of a rear axle. Each wheel has a rotation speed sensor 1a, 1b, 1c, and 1d, which transmit their respective signals via the respective lines 9a, 9b, 9c, and 9d. Furthermore, each wheel has brake cylinder 4a, 4b, 4c, and 4d, which receive a pressure medium through pressure lines 11a, 11b, 11c, and 11d when the brake is actuated. The wheel brakes of the front wheels are combined in a first brake circuit I and the wheel brakes of the rear wheels are combined in a second brake circuit II. Pressure control valves (valve arrangements) 2a, 2b, 2c and 2d are respectively associated with each wheel 8a, 8b, 8c, and 8d in pressure lines 11a through 11d; these control valves 2a, 2b, 2c and 2d can be actuated by electronic controller 5 via control lines 10. Pressure medium lines 11a through 11d conduct pressure medium from a reservoir 7 via a service brake valve (main brake cylinder) 3. Electronic controller 5 also has input lines 12 through 16, through which it receives further measured quantities for performing traction control, such as a signal indicating brake pedal actuation, gas pedal actuation or the actuation of a pushbutton switch by the driver. Electronic controller 5 controls, via output line 18, an engine regulator 6, which reduces the engine torque in conjunction with the traction control. Such an engine regulator 6 can be an electronic diesel controller or an electronic controller of a throttle valve of an internal combustion engine, for example. Another output line 19 leads to a display device (light, buzzer) 19a.

Electronic controller 5 implements an anti-lock system in which brake pressure is built up via appropriate activation of the respective valve arrangement 2a, 2b, 2c, and 2d when one wheel tends to lock until the locking tendency disappears.

With such a brake system equipped with an anti-lock system, traction control is executed as follows: At the time of start, a difference in rotation speed is detected in electronic controller 5 by comparison of the wheel speeds of the two driving wheels, in particular rear wheels 8c and 8d. In a preferred embodiment, the difference in wheel speeds of the two front wheels, 8a and 8b, which are not driven, is also taken into account, so that rotation speed differences due to cornering are compensated for. This is preferably done by raising the threshold value for the difference of the driving wheel speeds as a function of the difference of the front wheel speeds. If the difference of driving wheel speeds exceeds the threshold value, the pressure buildup valve on the driving wheel that rotates faster, i.e., the driving wheel with the higher rotation speed, is switched to increase the pressure. The valve arrangements on the slower driving wheels and the non-driven wheels are actuated so that no pressure medium can flow into the respective wheel brake cylinders. In this state of the brake system, the driver can introduce pressure in the brake cylinder of the spinning wheel by additional actuation of the brake pedal. The pressure is adjusted, by pressure buildup, pressure reduction, or pressure maintenance, by the controller 5 via the valve arrangement associated with this driving wheel; the rotation speed deviation remains within the predefined limits. The braking pressure in the respective wheel, built up by the driver's action on the brake pedal, is modulated by activating the valve arrangement for traction control. The differential locking effect is thus obtained.

In addition to comparing the difference in driving wheel rotation speeds, in another embodiment the wheel speeds of the individual driving wheels 8a, 8b, 8c, and 8d are checked using a reference speed formed on the basis of least one non-driven wheel. If the speed of the driving wheel exceeds the reference value by a certain value, the above-described state of the brake system is established to allow the driver to execute traction control.

In the case of a hydraulic brake system including an anti-lock system based on the recirculation principle, traction control is regulated with the ABS valve arrangements and the recirculation pump as a function of the wheel slip detected, after the brake pedal has been actuated with the left foot and pressure medium has been sent to the respective wheel brake cylinder.

In the above-described traction control, the pressure is built up via actuation of the brake pedal by the driver. In the preferred embodiment, the driver is informed by an ABS warning light or another display device such as a light or a buzzer 19a about the occurrence of the traction control event and the valve arrangements established for traction control. If this signal appears, the driver is allowed to build up pressure on the spinning driving wheel by actuating the brake pedal.

In the preferred embodiment, if drive slip occurs, the valve arrangements are set at the above-described positions and the driver is informed. In another embodiment, the sequence is reversed in that the driver is informed of the occurrence of drive slip and the valve arrangements do not assume their intended position until the driver actually presses the brake pedal.

One problem is that there are drivers who drive with the brake pedal depressed (e.g., when cornering with drive slip). Such drivers would usually not initiate the above-mentioned traction control, so that additional information is required concerning the driver's intentions. Therefore, in the preferred embodiment, a button is provided that the driver must press while pressing the brake and gas pedals simultaneously in order to initiate traction control. Pushing the button is a prerequisite for the valve arrangements 2a, 2b, 2c, and 2d to be brought into the positions suitable for executing traction control. In another embodiment, although the valve arrangements are switched for traction control, traction control is only executed if the button is pressed. In the preferred embodiment this button is designed as an illuminated safety button with an upward sliding cover. The button light or a separate warning light shows, in an advantageous embodiment, a positive wheel slip; when traction control is active, this steady display turns to a blinking display. It can also be advantageous to inform the driver through an acoustic or visual signal about the traction control being interrupted, for example, if one of the conditions described previously or in the following is violated or if wheel slip is controlled within a predefined range.

When the vehicle starts moving while or before traction control is executed, the valve arrangements 2a, 2b, 2c, and 2d have certain positions that isolate at least some of the wheel brakes from the service brake valve (main brake cylinder) 3. Therefore, during this phase, the vehicle cannot be braked again immediately, since first the valve arrangements 2a, 2b, 2c, and 2d must be switched over and the braking pressure desired by the driver must be built up. Therefore, traction control must be limited, through appropriate measures, to certain operating conditions, in particular to the start phase, in order to avoid undesirable driving situations. Thus, as mentioned before, traction control is only executed in the event of positive wheel slip after the button has been depressed by the driver and only while it is kept depressed by the driver. Another supplementary or alternative criterion is that the speed be in a low speed range, for example, below 10 km/h. As an alternative or in addition, in one embodiment the duration of the control has a time limit, so that after the elapse of a predefined period, control is interrupted even if slip is detected on at least one driving wheel. Another supplementary or alternative criterion for executing traction control is that it is only activated if both the brake and gas pedals are being depressed. This is established by evaluating the appropriate switches; the gas pedal position can also be transmitted to an electronic engine control device via an interface. Traction control is interrupted in this case if either switch no longer shows that the respective pedal is being depressed.

In addition to the above-described brake control, in a preferred embodiment engine control is performed by electronic controller 5 transmitting a signal to an appropriate engine regulator 6 to reduce the engine torque when wheel slip occurs and the other conditions for performing traction control are present. If wheel slip is back in the predefined range, engine torque is again increased to the value defined by the driver. Such torque control in conjunction with traction control are known to those skilled in the art.

Figure 2:
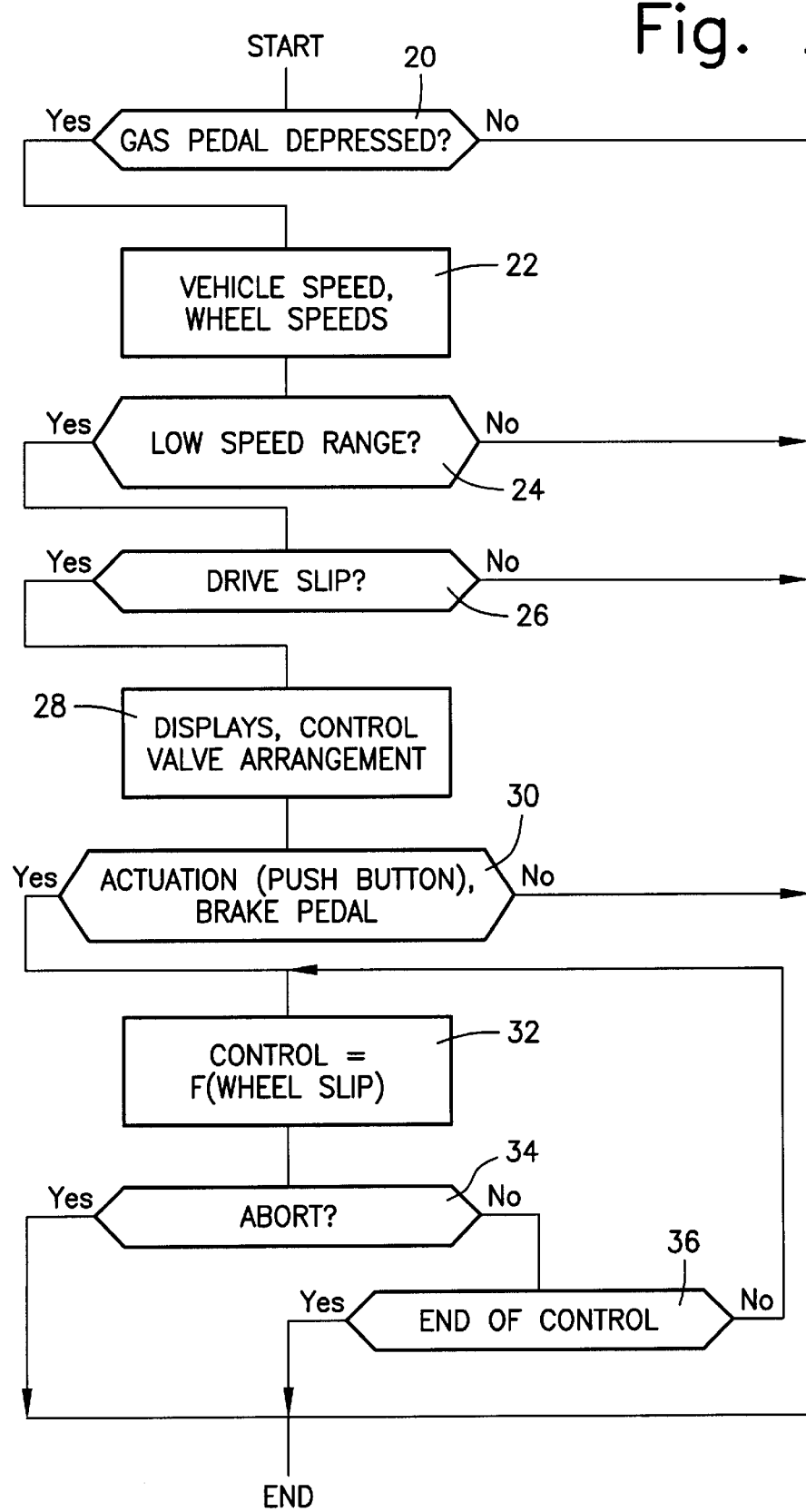
FIG. 2 shows a flow chart that represents a first embodiment of the traction control according to the present invention and is executed as a program in a control unit of the anti-lock system of FIG. 1.

In the preferred embodiment, traction control is implemented as a program of the microcomputer provided in electronic controller 5. FIG. 2 shows the flow chart for a preferred embodiment of such a program.

The program is run in predefined time intervals. In first step 20 it is checked whether the driver is depressing the gas pedal. This check is performed either on the basis of the switching state of a corresponding switch or on the basis of a transmitted gas pedal position signal. If the gas pedal is not being depressed, the vehicle speed (which may be formed from the rotation speeds of the non-driven wheels) and the wheel speed are entered in step 22. Then in step 24 it is checked whether the vehicle is traveling in a low speed range, for example, at a speed below 10 km/h. If this is not the case, the program is terminated; otherwise it is checked in query step 26, using the wheel speeds, whether an unallowable wheel slip is occurring on at least one wheel. If this is not the case, no reason exists for executing traction control, so that the program is terminated. If wheel slip has occurred on at least one driving wheel, this state is displayed to the driver in step 28 and the valve arrangements 2a, 2b, 2c, and 2d are set to the positions corresponding to traction control. Subsequently in step 30 it is checked whether the driver is actuating the brake pedal and possibly one pushbutton. This check is performed on the basis of a brake pedal switch and the corresponding information from the pushbutton. If the brake pedal or, in a preferred embodiment, the pushbutton is not being actuated, traction control is not performed despite the existing wheel slip, and the program is terminated. If the brake pedal and possibly the pushbutton are being actuated, in step 32 the wheel brake pressure in the driving wheel where unallowable wheel slip has appeared is controlled as described above depending on the wheel slip. In subsequent query step 34 it is checked whether traction control is to be aborted. Conditions for abort include, for example, the release of the pushbutton, the elapse of a predefined time period, leaving the speed range, the release of the brake or gas pedal, etc. If one of the abort conditions is met, the program is terminated; otherwise, a query is performed in step 36 whether traction control has been terminated, i.e., whether no more unallowable wheel slip has occurred and the pressure in the respective driving wheel brake has been reduced to its normal level. If this is the case, the program is terminated. If control is not yet terminated, the program is repeated with step 32.

Figure 3A:
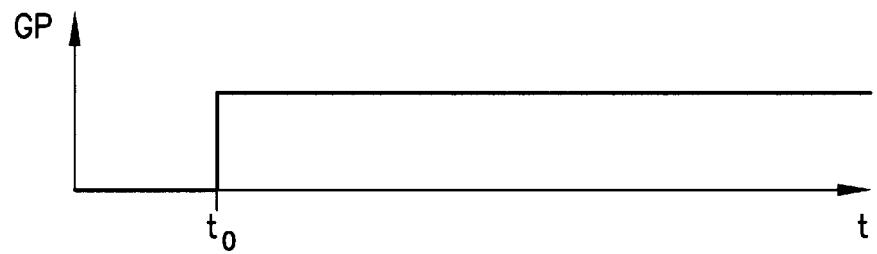
FIG. 3a shows a first time chart illustrating an operation of the traction control according to the present invention.
Figure 3B:
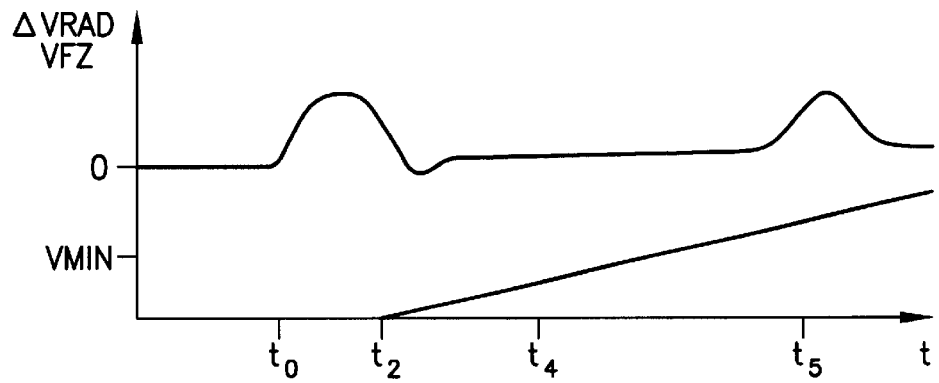
FIG. 3b shows a second time chart illustrating an operation of the traction control according to the present invention.
Figure 3C:
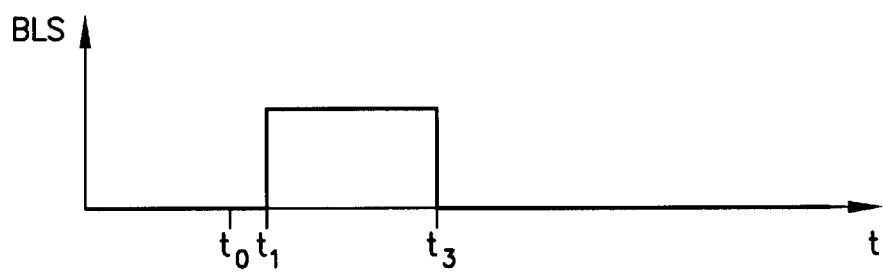
FIG. 3c shows a third time chart illustrating an operation of the traction control according to the present invention.
Figure 3D:
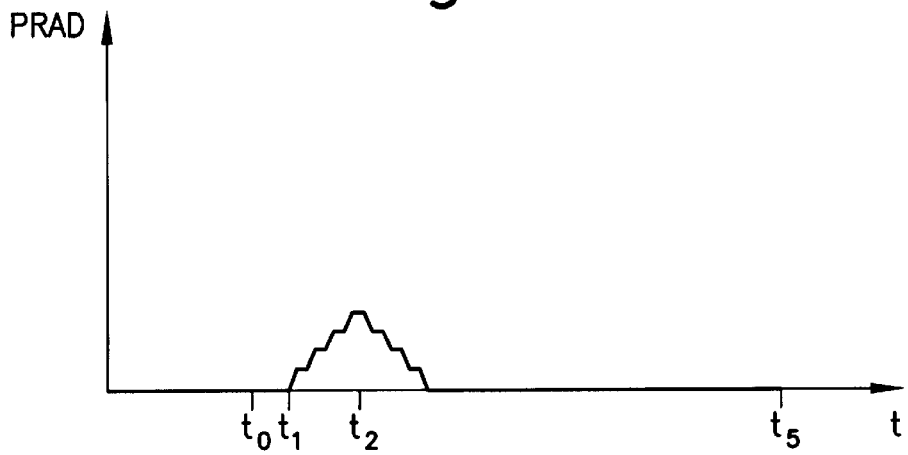
FIG. 3d shows a fourth time chart illustrating an operation of the traction control accordingly to the present invention.

The procedure described is further illustrated in FIGS. 3a through 3d using time charts. FIG. 3a shows the variation over time of gas pedal state GP; FIG. 3b shows the variation of vehicle speed VFZ and of the difference ΔVRAD of the driving wheel speeds. FIG. 3c shows the variation over time of the switching state of brake pedal switch BLS, while FIG. 3d shows the variation of wheel brake pressure PRAD.

At time t0, the driver depresses the gas pedal (see FIG. 3a). According to FIG. 3b, upper chart, this results in a difference between the speeds of the driving wheels. The vehicle cannot start moving. Therefore at time t0 the valve arrangements are set to the positions provided for traction control, and the situation is displayed to the driver. The driver depresses the brake pedal at time t1 according to FIG. 3c. This results in pressure being introduced in the respective wheel brake cylinder, as shown in FIG. 3d, which causes the difference between the wheel speeds to gradually diminish. Starting at time t2, at which the vehicle starts moving (see FIG. 3b), the brake pressure is reduced again. Then the control sequence is terminated and the driver releases the brake pedal at time t3 according to FIG. 3c. The vehicle starts moving. The vehicle speed exceeds minimum speed VMIN (see FIG. 3b), so that any instability that reappears at time t5 can no longer be controlled using the above-described traction control system. In this case, the driver himself must diminish the torque by easing up on the gas pedal.

The above-mentioned measures for performing traction control are used individually or in any desired combination.

Figure 4:
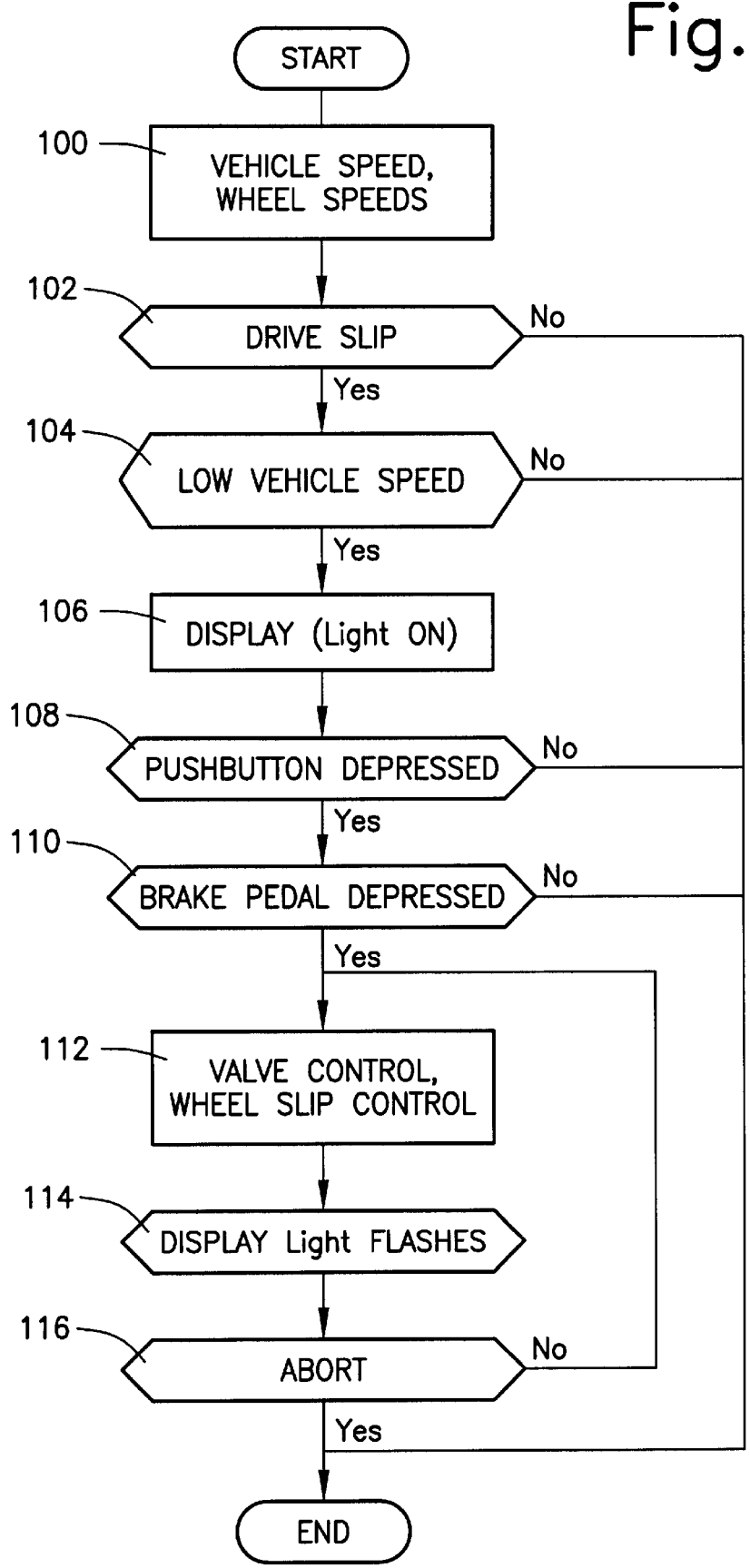
FIG. 4 shows a flow chart corresponding to a second embodiment of the traction control of the present invention.

FIG. 4 shows a second embodiment of the traction control, where the simultaneous depression of the gas and brake pedals is not a mandatory prerequisite for activating traction control. This is important, for example, in systems where no information is available on the gas pedal position.

After starting the program, vehicle speed and wheel speed are entered in first step 100. Then, in second step 102, as illustrated above, it is checked whether drive slip is present on at least one wheel. If this is not the case, the program is terminated and repeated at an appropriate time. If the answer is yes, a query is made in step 104 whether the vehicle is moving at a speed in the low range. If not, the program is terminated and repeated at an appropriate time; if yes, a light is switched on in step 106. Then it is checked in step 108 whether the pushbutton has been depressed. If this is not the case, the program is terminated and repeated at an appropriate time. In the case of a yes answer, in the following step 110 it is checked whether the brake pedal has been depressed. If this is the case, the above-described valve control and traction control are performed in step 112. If the brake pedal has not been depressed, the program is terminated and repeated at an appropriate time. After step 112, the active traction control display is activated in step 114 (the light flashes) and then it is checked in step 116 whether an abort or termination criterion has been met. If this is the case, the program is terminated and repeated at an appropriate time; otherwise, it is continued with step 112.

What is claimed is:

1. A method for providing a traction control in a motor vehicle equipped with an anti-lock system, comprising the steps of:

detecting a wheel speed of at least each driving wheel of the motor vehicle;

providing a valve arrangement for each driving wheel, each valve arrangement being capable of performing a pressure building operation, a pressure maintaining operation, and a pressure reducing operation; and when an unallowable slip occurs on at least one driving wheel, modulating a brake pressure built up by a driver of the motor vehicle in a wheel brake associated with the at least one driving wheel exhibiting the unallowable slip by setting the valve arrangement associated with the at least one driving wheel exhibiting the unallowable slip to a traction control position, wherein the brake pressure modulation occurs only if a brake pedal of the motor vehicle is being depressed by the driver and at least one of the following criteria is satisfied:

a) the driver has actuated an additional switching element, b) a speed of the motor vehicle is less than a predefined threshold value, c) a predefined time period has not elapsed since a beginning of the traction control, and d) the driver has actuated a gas pedal of the motor vehicle.

2. The method according to claim 1, wherein when the unallowable slip occurs, the method further comprises the steps of:

switching the valve arrangement associated with the at least one driving wheel exhibiting the unallowable slip to provide the pressure building operation; and setting each other valve arrangement to provide one of the pressure maintaining operation and the pressure reducing operation.

3. The method according to claim 1, further comprising the step of displaying to the driver at least one of an indication of the unallowable slip and an indication of an establishment of a valve arrangement state.

4. The method according to claim 3, wherein the step of displaying includes the steps of:

activating a light display element when the unallowable slip occurs, and flashing the light display element when the brake pressure modulation is active.

5. The method according to claim 1, wherein the unallowable wheel slip is detected by determining when the wheel speeds of the driving wheels differ by an unallowable amount.

6. The method according to claim 1, wherein the unallowable wheel slip is detected by determining when the wheel speed of one driving wheel differs from a predefined reference speed by an unallowable amount.

7. The method according to claim 1, further comprising the step of reducing a motor torque of the motor vehicle.

8. A device for providing a traction control in a motor vehicle equipped with an anti-lock system, comprising:

a valve arrangement associated with each driving wheel of the motor vehicle, each valve arrangement being capable of performing a pressure building operation, a pressure maintaining operation, and a pressure reducing operation; and an electronic controller for performing the following steps:

detecting a wheel speed of at least each driving wheel of the motor vehicle, and when an unallowable slip occurs on at least one driving wheel, modulating a brake pressure built up by a driver of the motor vehicle in a wheel brake associated with the at least one driving wheel exhibiting the unallowable slip by setting the valve arrangement associated with the at least one driving wheel exhibiting the unallowable slip to a traction control position, wherein the electronic controller includes an arrangement for performing the brake pressure modulation only if a brake pedal of the motor vehicle is being depressed by the driver and at least one of the following criteria is satisfied:

a) the driver has actuated an additional switching element, b) a speed of the motor vehicle is less than a predefined threshold value, c) a predefined time period has not elapsed since a beginning of the traction control, and d) the driver has actuated a gas pedal of the motor vehicle.

* * * * *